US007471646B2

(12) United States Patent
Schultz (10) Patent No.: US 7,471,646 B2
(45) Date of Patent: Dec. 30, 2008

(54) SYSTEM AND METHODS FOR INLINE PROPERTY EDITING IN TREE VIEW BASED EDITORS

(75) Inventor: Kristoffer Schultz, Nivaa (DK)

(73) Assignee: Microsoft Corporation, Redmond, WA (US)

( * ) Notice: Subject to any disclaimer, the term of this patent is extended or adjusted under 35 U.S.C. 154(b) by 697 days.

(21) Appl. No.: 11/032,816

(22) Filed: Jan. 10, 2005

(65) Prior Publication Data
US 2006/0153097 A1    Jul. 13, 2006

(51) Int. Cl.
*H04J 1/16* (2006.01)
*H04L 12/56* (2006.01)

(52) U.S. Cl. ................. 370/256; 370/252; 715/232

(58) Field of Classification Search ............ 370/252, 370/254–258, 386, 400; 379/355.09; 715/763, 715/854, 513; 705/27
See application file for complete search history.

(56) References Cited

U.S. PATENT DOCUMENTS

| | | | |
|---|---|---|---|
| 5,537,630 A | 7/1996 | Berry et al. .............. 715/763 |
| 5,917,492 A | 6/1999 | Bereiter ................... 715/854 |
| 6,055,515 A | 4/2000 | Consentino et al. ......... 705/27 |
| 6,424,711 B1 * | 7/2002 | Bayless et al. ........ 379/355.09 |
| 6,665,687 B1 | 12/2003 | Burke ................... 707/104.1 |
| 7,168,035 B1 * | 1/2007 | Bell et al. ................ 715/234 |

FOREIGN PATENT DOCUMENTS

CA    2 432 631 A1    12/2004

OTHER PUBLICATIONS

Sramsay, "CPropTree v1.0-Property Tree Control", www.codeproject.com, Jan. 2, 2002, 5 pages, XP-002455463.

* cited by examiner

*Primary Examiner*—John Pezzlo
(74) *Attorney, Agent, or Firm*—Woodcock Washburn LLP (57) ABSTRACT

A system and method directed to inline property editing for tree view based editors is provided. A user selects a desired node within a tree view and then hovers the mouse cursor over the node causing a smart tag anchor to appear. When the user clicks on the smart tag anchor an object property panel appears injected into the tree showing property and attributes for the selected node. The panel appears in direct visual proximity to the node, such as directly below the node while the node appears in its location within the tree. The tree is expanded such that the property panel does not visually obscure any part of the tree. Multiple panels may be opened simultaneously such that property and attribute information may be visually compared for various nodes.

19 Claims, 5 Drawing Sheets

SYSTEM AND METHODS FOR INLINE PROPERTY EDITING IN TREE VIEW BASED EDITORS

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2004, Microsoft Corp.

FIELD OF THE INVENTION

This invention relates to graphical user interfaces. More particularly, this invention relates to systems and methods for viewing and editing properties of tree elements via a graphical user interface within a development environment.

BACKGROUND OF THE INVENTION

Most modern software is typically created with a great deal of computer automated assistance. Such assistance is commercially available through any of a number of integrated development environments, or IDEs. For example, MICROSOFT'S VISUAL STUDIO®, BORLAND'S C++ BUILDERS, METROWERK'S CODE WARRIOR®, and IBM'S WEBSPHERE STUDIO® are all products presently available to assist in software creation. Such products provide a range of useful functions, such as, for example, editing properties of a software element (code file, control, field, etc.).

Tree view based editors within IDEs are intended for editing hierarchical data structures enabling the user to add elements and build hierarchical data structures while seeing the hierarchy as it exists in the tree structure. Editing the individual nodes' properties is an essential part of building these data structures, and thus it is desirable to have an integrated experience when creating elements in the tree and setting the properties. However, the editing of properties for nodes within the tree is typically done in a visually separate window or place, which is distracting to the user as it removes his or her focus from the content (code, metadata, etc.) that he or she is working on. Thus, it is desirable for a user to have an improved experience that will keep the user focused at the primary task in one place.

In this regard, there is a need for systems and methods that provide users of tree view based editors an improved experience in editing and viewing element properties which will keep a user focused in one place at the primary task.

SUMMARY OF THE INVENTION

In consideration of the above-identified shortcomings of the art, the invention provides systems and methods for managing information pertaining to a node of a tree.

For several embodiments of the present invention a method for managing information pertaining to a node of a tree is provided comprising first indicating a node for which information is desired. Then, upon said indication, information is displayed regarding the node in direct visual proximity to the node. The node visually appears in the tree with the displayed information in direct visual proximity to the node, and the displayed information does not visually obscure any part of the tree. Also editing the information of the node may be accomplished via changing the displayed information.

In a further characterization, the information of the node comprises at least one property of a node of a software data structure. In yet another characterization, a mouse is used to indicate changes to the information by clicking in an appropriate location inside an area of the displayed information. Other advantages and features of the invention are described below.

BRIEF DESCRIPTION OF THE DRAWINGS

The systems and methods for inline property editing in tree view based editors are further described with reference to the accompanying drawings in which.

DETAILED DESCRIPTION OF ILLUSTRATIVE EMBODIMENTS

Certain specific details are set forth in the following description and figures to provide a thorough understanding of various embodiments of the invention. Certain well-known details often associated with computing and software technology are not set forth in the following disclosure to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention.

Overview

Figure 4:
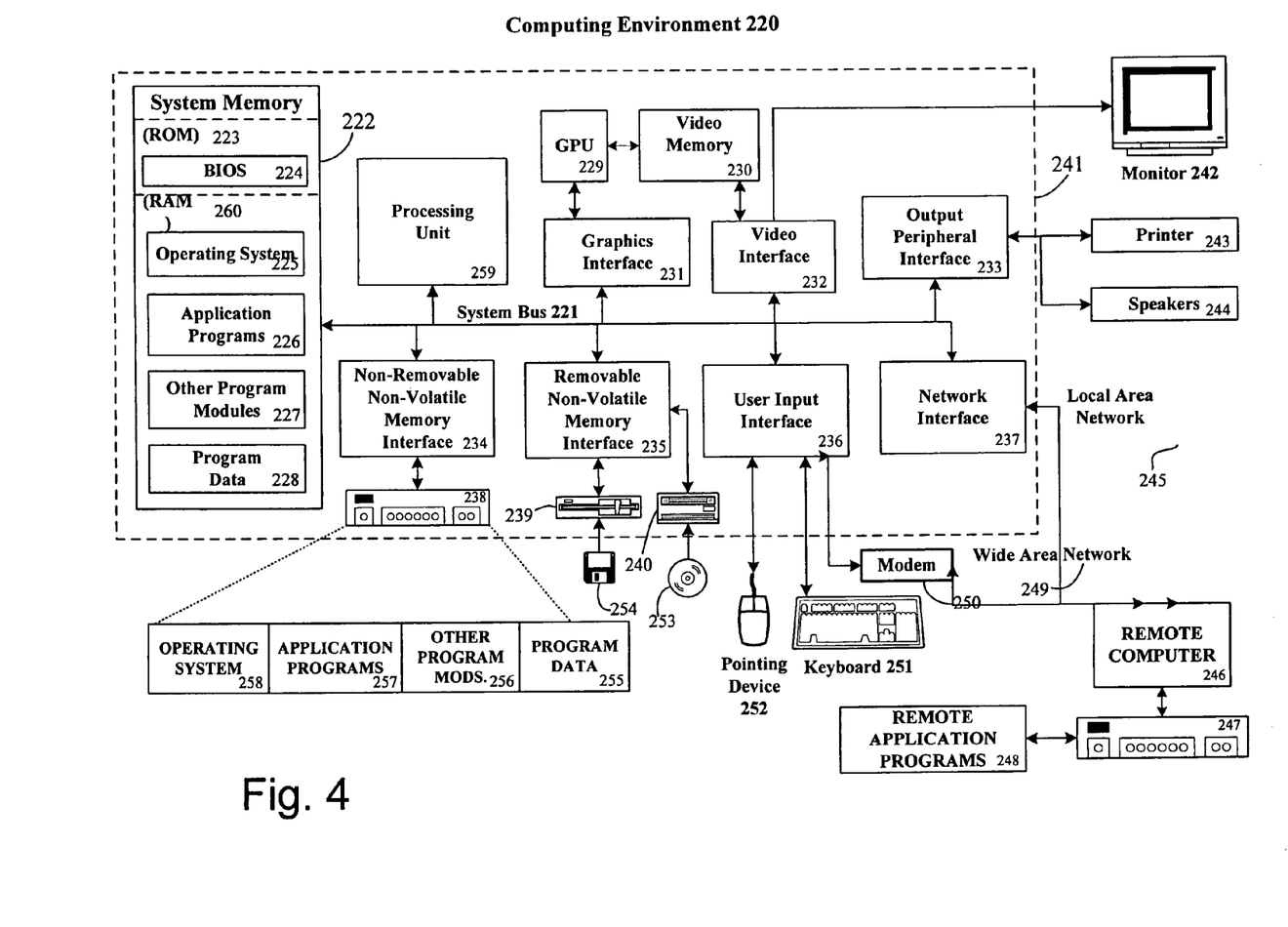
FIG. 4 is a block diagram representing an exemplary computing device suitable for use in conjunction with various aspects of the invention.
Figure 5:
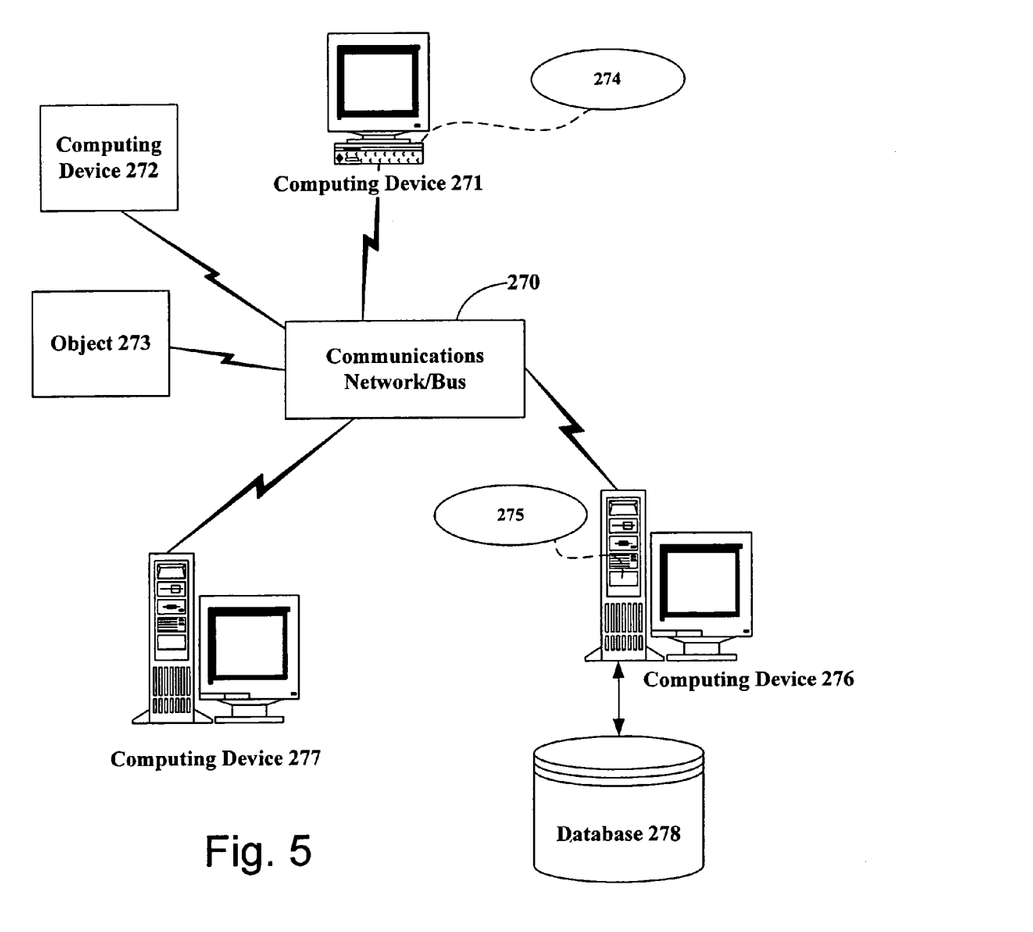
FIG. 5 illustrates an exemplary networked computing environment in which many computerized processes may be implemented.

Systems and methods are described for providing a user interface for an integrated development environment (IDE) with inline property editing using an object property panel in tree-view based editors. Described are systems an methods that enable a user to edit the properties of a selected tree node directly in the tree itself. First, an exemplary tree-view interface will be described showing an example of inline property editing using an object property panel. Next, processes for inline property editing using the object property panel of FIG. 1 will be described. Finally, FIGS. 4 and 5 provide a computing and networked environment which will be recognized as generally suitable for use in connection with the systems and methods set forth herein. Because the material in FIGS. 4 and 5 is generally for exemplary purposes, the corresponding description is reserved for the end of this specification, in the section entitled "exemplary computing and network environment."

Tree View Interface and Object Property Panel

Figure 1:
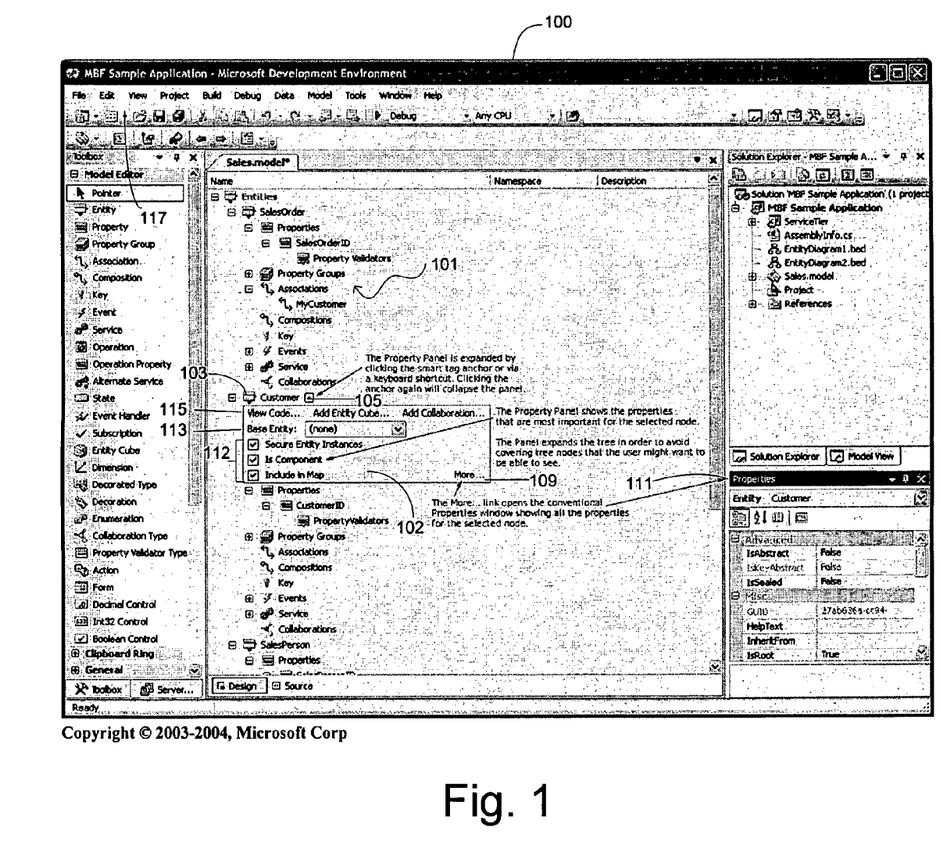
FIG. 1 is a screenshot of a graphical user interface showing an example of inline property editing using an object property panel in MICROSOFT VISUAL STUDIO® according to the present invention.

Referring first to FIG. 1, shown is a screenshot of a graphical user interface showing an example of inline property editing using an object property panel in MICROSOFT VISUAL STUDIO® according to the present invention. Shown is an exemplary user interface 100 containing a tree view 101 based editor of an IDE. The particular IDE shown in FIG. 1 is that of MICROSOFT VISUAL STUDIO®, however, the present invention disclosed herein is applicable to any tree-view based editor or comparable IDE. Also, relevantly shown is an object property panel (property panel) 102, a current node in focus 103 of the tree view 101, a smart tag anchor 105, a link 109 to open a conventional property window 111, a plurality of important properties 112 to the current node in focus 103, a base entity field 113, a plurality of links 115 to actions that may be taken on the node in focus 103, and a collapse property panels button 117.

As shown in FIG. 1, the property panel 102 is displayed for the current node in focus 103 (i.e., the selected node 103). The selected node 105 is that node which the user has selected in some fashion, be it with a mouse or keyboard, in order to perform some activity with respect to that node. In the instance of FIG. 1, the node "Customer" is the currently selected node 103. However, any other node in the tree view 101 may be subject to such selection and focus by the user and potentially have the property panel 102 for that particular node displayed. A smart tag anchor 105 is in visual proximity to the selected node 103 and is used to display and collapse the property panel 102. However, the particular process for activating and displaying the property panel 102 will be described in detail in discussion below in conjunction with FIGS. 2 and 3.

The property panel contains a list of modifiable properties including primary and mandatory fields that are most important for the particular selected node 103. The definition and number of which properties are important, or those that are to be displayed in the property panel 102, may be defined by the user, or pre-set by the IDE software manufacturer. The idea is that the properties which would be the most useful to the user if displayed in the property panel 102, are generally those that are displayed in the property panel 102. These may be, for example, properties that the user will most likely want to manipulate. There may also be a field to assign a base entity 113 with respect to the selected node 103. Also various links 115 may be present within the property panel 102 such as "View Code," "Add Entity Cube," and "Add Collaboration," for example, that when followed, perform the corresponding actions with respect to the selected node 103. Via the "More." link 109 that may appear within the property panel 102, the user navigates to the conventional properties window 111 from the property panel 102, which is a view of all the properties of the selected node 103. This allows the user to get the "big picture" for that particular selected node 103. These particular options are displayed in FIG. 1 for exemplary purposes only and it is entirely within the scope of the present invention to have more or less options to perform actions with respect to the selected node 103 available in the property panel 102 for that particular node 103. Also, the options existing within the property panel 102 to perform actions or display information corresponding to the selected node 103, including those described above, may be implemented via a variety of interfaces within the property panel 102, such as links, buttons, smart tags, drop down lists, combo-boxes, selection boxes, entering text commands, for example, and are not limited to those shown in FIG. 1 or described herein.

As is shown in FIG. 1., the property panel 102 is displayed such that the other items (e.g., nodes) in the tree view 101 are not obscured or covered by the property panel when the property panel 102 appears. In other words, the property panel expands the tree view under the selected node 103 and does not cover any of the tree view 101. For example, in FIG. 1, the node "Properties" under the current node in focus 103 (i.e., the Customer node) is visually displayed under rather than behind the property panel 102 of the current node in focus 103. The reason for expanding the tree view 101 is that the user is likely to want to compare properties for multiple tree nodes at the same time, in which case the property panel (s) 102 can not hide any of the tree view 101 content.

Also, multiple property panels 102, corresponding to multiple nodes 103 may be activated and displayed simultaneously in the tree view 101. As each property panel 102 is displayed, it is inserted into the tree view 101 such that it does not cover any of the elements in the tree view 101. If a user wishes to collapse or close all of the property panels 102, the collapse property panels button 117 is located within the user interface 100 such that when a user clicks on it, all of the property panels 103 close at once.

Inline Property Editing Process

Figure 2:
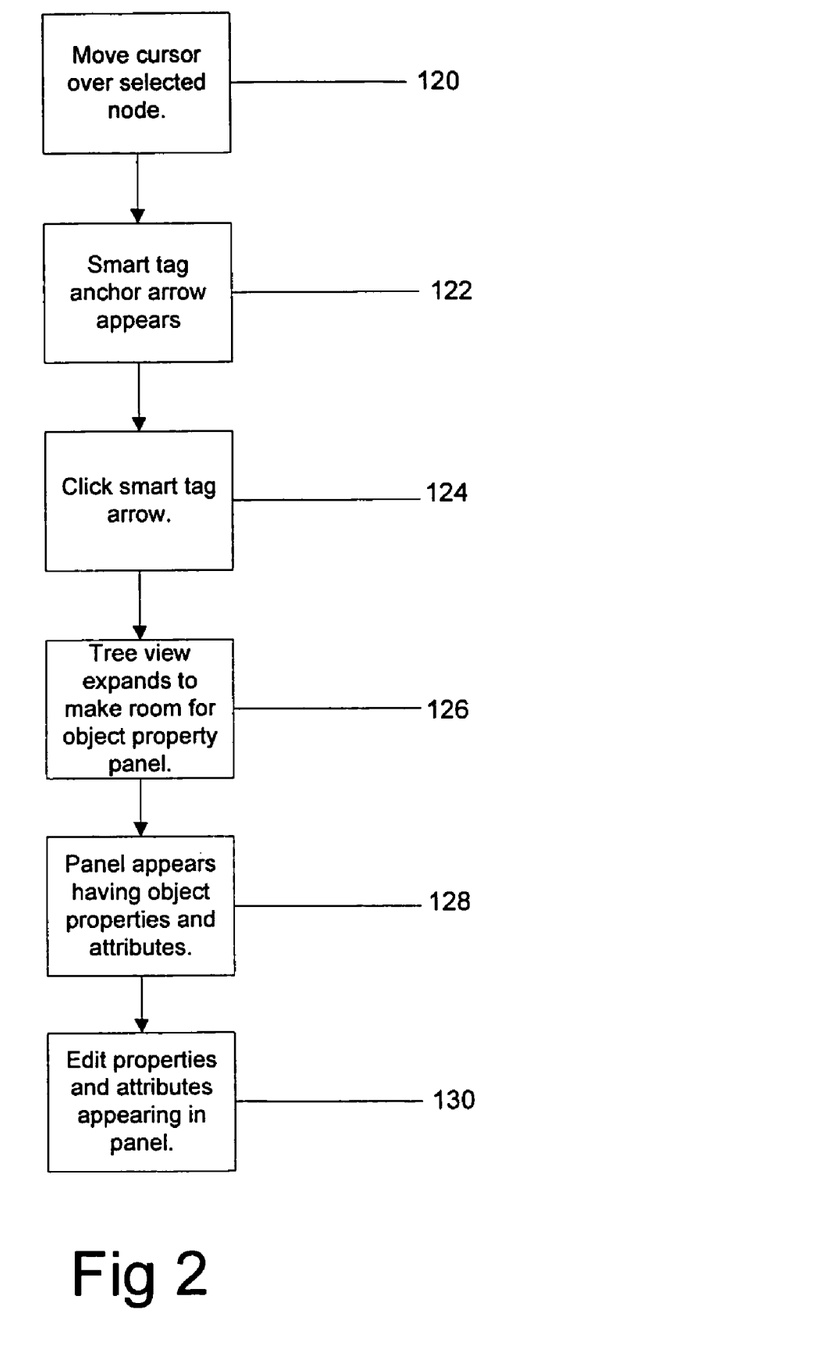
FIG. 2 is a flow chart illustrating a process for inline property editing using the object property panel of FIG. 1 according to the present invention.

Referring next to FIG. 2, shown is a flow chart illustrating a process for inline property editing using the object property panel of FIG. 1. In particular, FIG. 2 illustrates the process for activating and displaying the property panel 102 of FIG. 1 of a selected node 103 and editing the properties of the selected node 103. First, a user moves the mouse cursor 120 over a selected node 103. Then a smart tag anchor arrow 105 appears 122 upon the mouse cursor hovering over the selected node 103. The user then clicks 124 on the smart tag anchor arrow 105. This causes the tree view 101 to expand 126 to make room for the property panel 102 to appear such that the other items in the tree view 101 are not obscured or covered by the property panel 102. Then the property panel 102 appears 128 below the selected node 103 containing properties and attributes of the selected node 103. A user may then quickly and easily edit 130 the properties and attributes appearing in the property panel 102 for the selected node 103. Also the process may be repeated for other selected nodes in the tree view 101 such that multiple property panels, such as property panel 102 may be displayed simultaneously enabling the user to visually compare properties for multiple tree nodes at the same time. The user can close or collapse each property panel individually by clicking again on the smart tag anchor arrow 105, or close all the open property panels at once by clicking on the collapse property panels button 117 located within the user interface 100 as described above.

Figure 3:
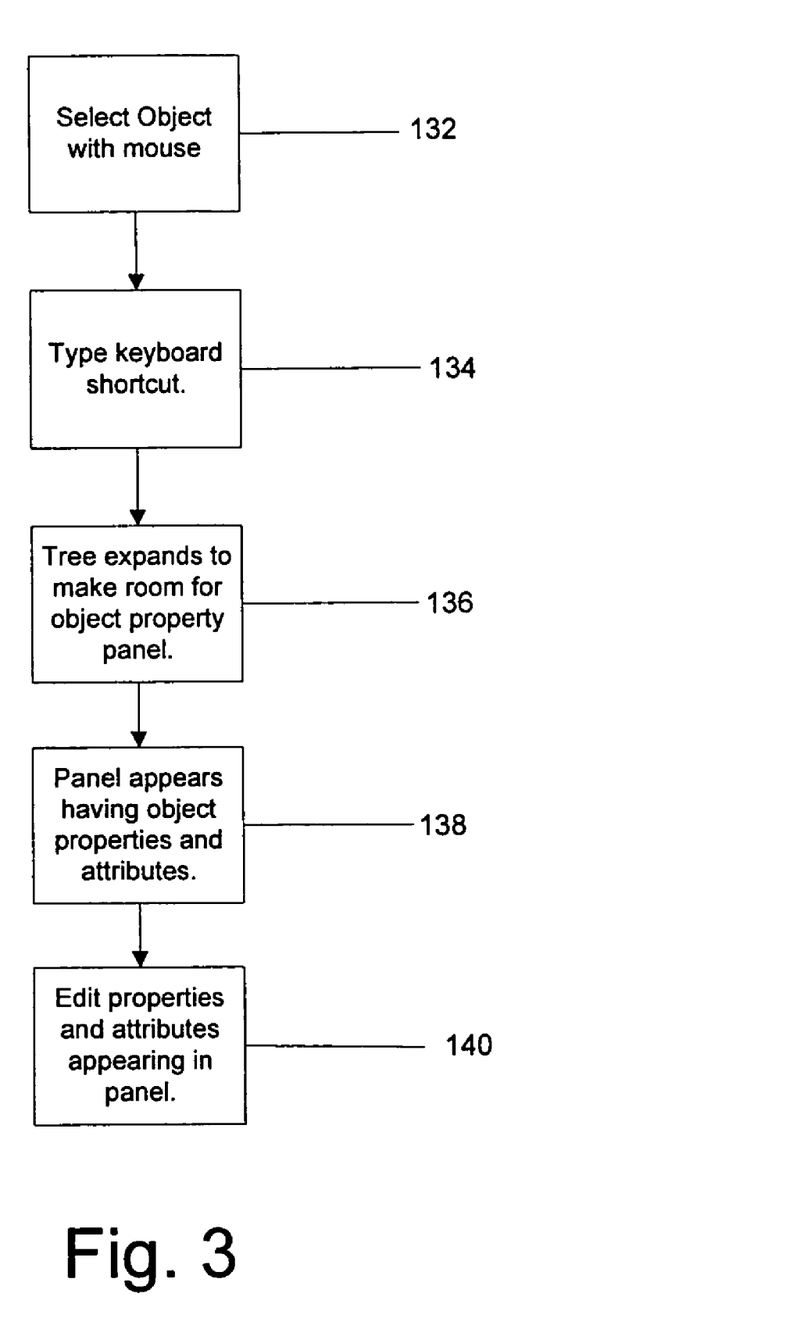
FIG. 3 is a flow chart illustrating an alternative process for inline property editing using the object property panel of FIG. 1 according to the present invention.

Referring next to FIG. 3, shown is a flow chart illustrating an alternative process for inline property editing using the object property panel of FIG. 1 according to the present invention. In particular, FIG. 3 illustrates an alternative process using a sequence of keystrokes, or a "keyboard shortcut," for activating and displaying the property panel 102 of FIG. 1 of a selected node 103. First, a user selects 132 a node 103 for which he or she wishes to see the properties. This may be done, for example, by clicking on the desired node 103 in the tree view 101. Once the node is selected 132, the user then types a keyboard shortcut such as Ctrl-Alt-F10, for example. Other key sequences may also be used. This causes the tree view 101 to expand 136 to make room for the property panel 102 to appear such that the other items in the tree view 101 are not obscured or covered by the property panel 102. Then the property panel 102 appears 138 below the selected node 103 containing properties and attributes of the selected node 103. A user may then quickly and easily edit 140 the properties and attributes appearing in the property panel 102 for the selected node 103. Once the user is finished with viewing and/or setting the properties for the selected node 103, he or she may close the property panel 102 in the same fashion as described above or by another pre-defined keyboard shortcut.

The various processes and objects comprising aspects of the invention may be developed using a variety of tools known to those of ordinary skill in the art and implemented in either hardware or software. For example, the user interface as described above may be developed using MICROSOFT VISUAL STUDIO® and coded in C#, but is not limited to being implemented in any particular programming language or development environment.

Exemplary Computing and Network Environment

Referring to FIG. 4, shown is a block diagram representing an exemplary computing device suitable for use in conjunction with various aspects of the invention. For example, the computer executable instructions that carry out the processes and methods for inline property editing in tree views may reside and/or be executed in such a computing environment as shown in FIG. 4. The computing system environment 220 is only one example of a suitable computing environment and is not intended to suggest any limitation as to the scope of use or functionality of the invention. Neither should the computing environment 220 be interpreted as having any dependency or requirement relating to any one or combination of components illustrated in the exemplary operating environment 220.

Aspects of the invention are operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the invention may be implemented in the general context of computer-executable instructions, such as program modules, being executed by a computer. Generally, program modules include routines, programs, objects, components, data structures, etc. that perform particular tasks or implement particular abstract data types. Aspects of the invention may also be practiced in distributed computing environments where tasks are performed by remote processing devices that are linked through a communications network. In a distributed computing environment, program modules may be located in both local and remote computer storage media including memory storage devices.

An exemplary system for implementing aspects of the invention includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 241. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 4 illustrates operating system 225, application programs 226, other program modules 227, and program data 228.

The computer 241 may also include other removable/non-removable, volatile/nonvolatile computer storage media. By way of example only, FIG. 4 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 4, provide storage of computer readable instructions, data structures, program modules and other data for the computer 241. In FIG. 4, for example, hard disk drive 238 is illustrated as storing operating system 258, application programs 257, other program modules 25.6, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 4. The logical connections depicted in FIG. 4 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 4 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the invention, e.g., through the use of an API, reusable controls, or the like. Such programs are preferably implemented in a high level procedural or object oriented programming language to communicate with a computer system. However, the program (s) can be implemented in assembly or machine language, if desired. In any case, the language may be a compiled or interpreted language, and combined with hardware implementations.

Although exemplary embodiments refer to utilizing aspects of the invention in the context of one or more stand-alone computer systems, the invention is not so limited, but rather may be implemented in connection with any computing environment, such as a network or distributed computing environment. Still further, aspects of the invention may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

An exemplary networked computing environment is provided in FIG. 5. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 5 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 5, and may itself represent multiple interconnected networks. In accordance with an aspect of the invention, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 5, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 4 and the further diversification that can occur in computing in a network environment such as that of FIG. 5, the systems and methods provided herein cannot be construed as limited in any way to a particular computing architecture. Instead, the invention should not be limited to any single embodiment, but rather should be construed in breadth and scope in accordance with the appended claims.

What is claimed:

1. A method for managing information pertaining to a node of a tree view comprising:
   selecting a node of the tree view;
   indicating for the node that information regarding the node other than sub-node information of the node is desired; and
   upon said indication, displaying on a display device the information regarding the node in direct visual proximity to the node, wherein the node visually appears in the tree view with the displayed information in direct visual proximity to the node, and wherein the displayed information does not visually obscure any part of the tree view.

2. The method of claim 1 further comprising editing the information of the node via changing the displayed information.

3. The method of claim 2 wherein the information of the node comprises at least one property of a node of a software data structure.

4. The method of claim 2 wherein the act of editing comprises:
   using a mouse to indicate changes to the information by clicking in an appropriate location inside an area of the displayed information.

5. The method of claim 1 wherein the act of displaying the information comprises:
   inserting the information regarding the node visually below the node while the node visually appears in the tree view; and
   expanding the tree view below the node to make a space for the displayed information such that the displayed information does not visually obscure any part of the tree view.

6. The method of claim 1 wherein the act of indicating comprises:
   hovering a mouse pointer over the node;
   displaying an indication next to the node that there is information about the node available for display; and
   clicking on the indication.

7. The method of claim 1 wherein the act of indicating comprises:
   typing at least one key on a keyboard to indicate a desire to display information pertaining to the node.

8. The method of claim 1 further comprising:
   indicating at least a second node for which information is desired; and
   upon said indication, displaying information regarding the at least second node in direct visual proximity to the at least second node, wherein the at least second node visually appears in the tree view with the displayed information in direct visual proximity to the at least second node, and wherein the displayed information does not visually obscure any part of the tree view; and
   simultaneously displaying information for another node than the at least second node.

9. The method of claim 8 further comprising:
   closing the displayed information for any and all nodes at once by mouse-clicking in a single designated area.

10. The method of claim 8 further comprising:
    closing the displayed information for any and all nodes at once by typing a designated key sequence on a keyboard.

11. The method of claim 1 further comprising:
    closing the displayed information for the node by indicating in the same fashion as indicating the node for which information is desired.

12. The method of claim 11 wherein the act of closing comprises:
    displaying an indication visually next to the node that there is information about the node currently being displayed;
    clicking on the indication;

removing the displayed information; and restoring the tree view such that there is no visual gap where the displayed information was previously displayed.

13. A computer readable volatile or non-volatile medium having instructions stored thereon for, when executed by a computer, performing a method for managing information pertaining to a node of a tree view, said method comprising:

selecting a node of the tree view;

indicating for the node that information regarding the node other than sub-node information of the node is desired;

upon said indication, displaying on a display device information regarding the node in direct visual proximity to the node, wherein the node visually appears in the tree view with the displayed information in direct visual proximity to the node, and wherein the displayed information does not visually obscure any part of the tree view.

14. The computer readable volatile or non-volatile medium according to claim 13 further comprising having instructions stored thereon for, when executed by a computer, editing the information of the node via changing the displayed information.

15. The computer readable volatile or non-volatile medium according to claim 13 wherein the information of the node comprises at least one property of a node of a software data structure.

16. The computer readable volatile or non-volatile medium according to claim 14 wherein the act of editing comprises using a mouse to indicate changes to the information by clicking in an appropriate location inside an area of the displayed information.

17. The computer readable volatile or non-volatile medium according to claim 13 wherein the act of displaying the information comprises:

inserting the information regarding the node visually below the node while the node visually appears in the tree view; and expanding the tree view below the node to make a space for the displayed information such that the displayed information does not visually obscure any part of the tree view.

18. The computer readable volatile or non-volatile medium according to claim 13 wherein the act of indicating comprises:

hovering a mouse pointer over the node;

displaying an indication next to the node that there is information about the node available for display; and clicking on the indication.

19. The computer readable volatile or non-volatile medium according to claim 13 wherein the act of indicating comprises:

typing at least one key on a keyboard to indicate a desire to display information pertaining to the node.

\* \* \* \* \*